Sept. 19, 1933.  H. E. BLOOD ET AL  1,927,483
SYNCHRONIZED TRANSMISSION
Filed Feb. 1, 1929    5 Sheets-Sheet 1
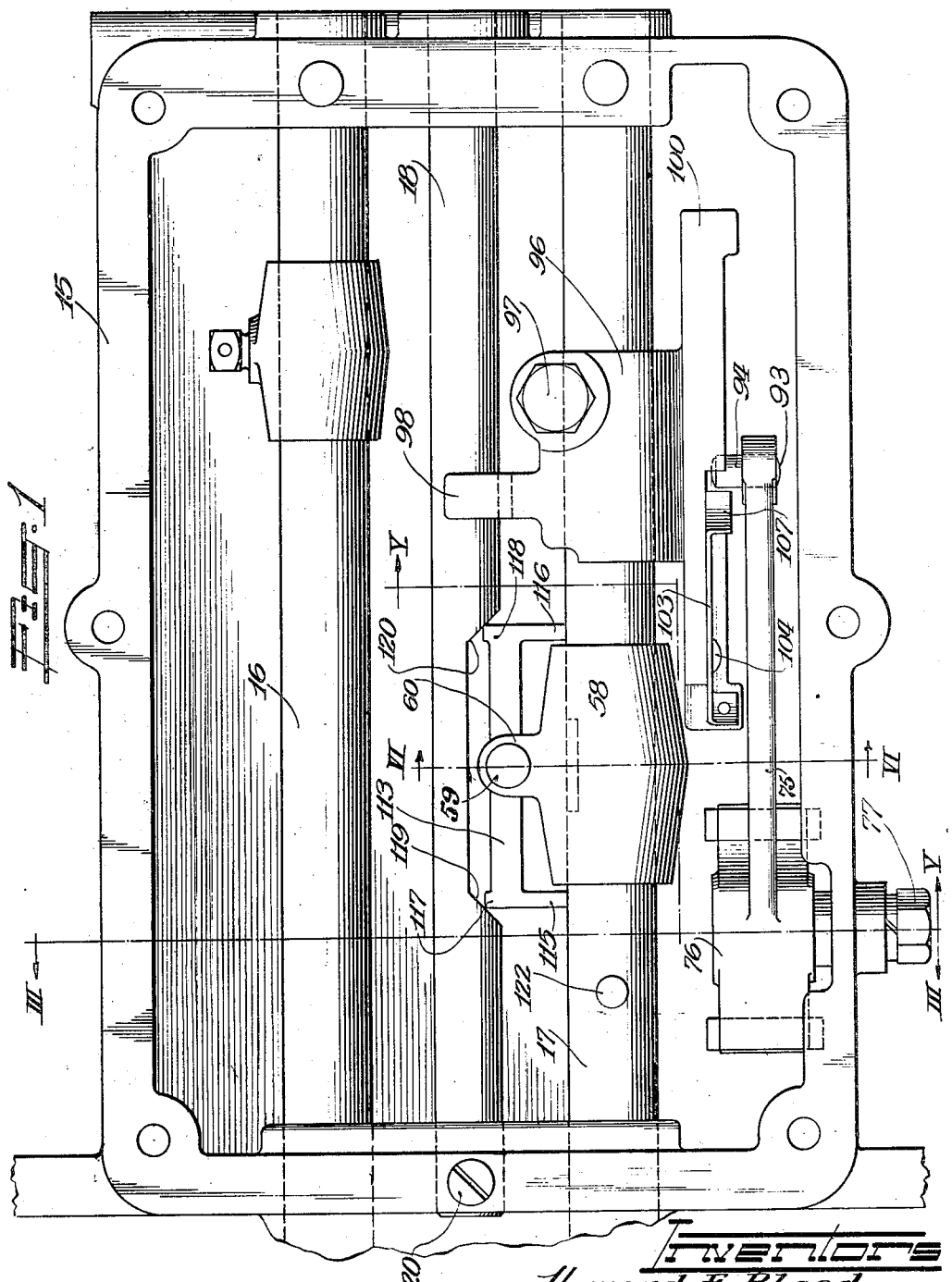
Inventors
Howard E. Blood.
John G. Buchanan.
Robert L. Mapson.
by: Charles W. Hills Attys.

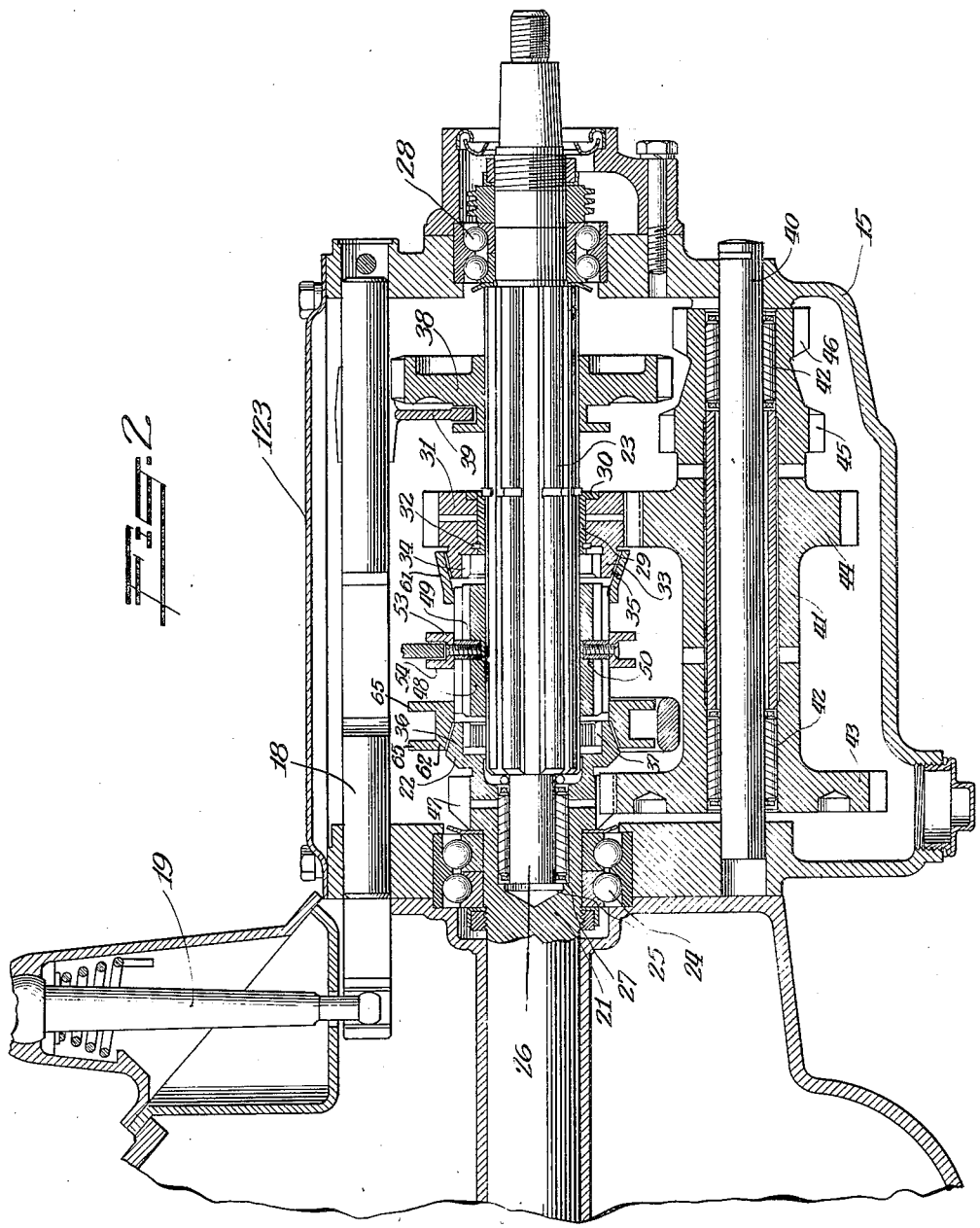

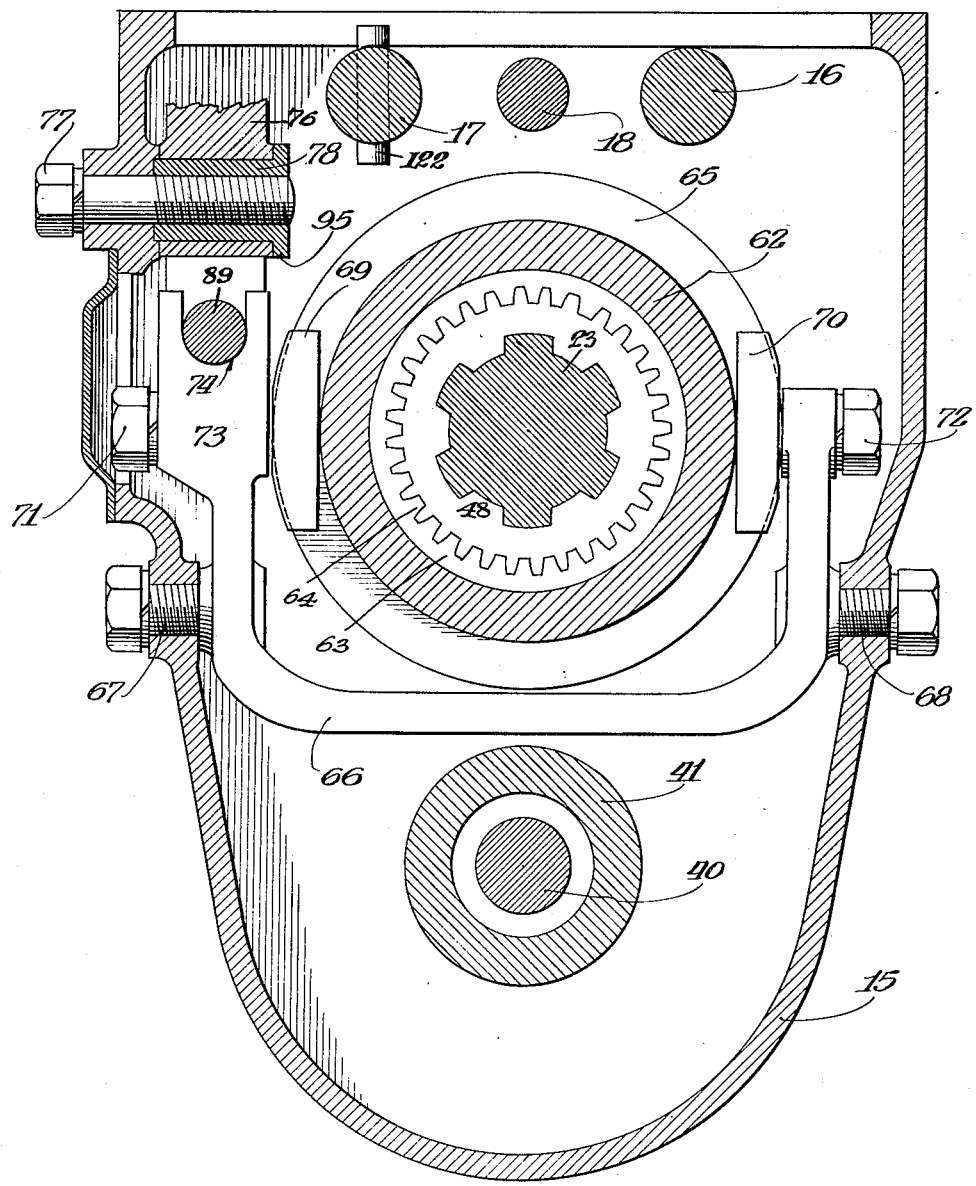

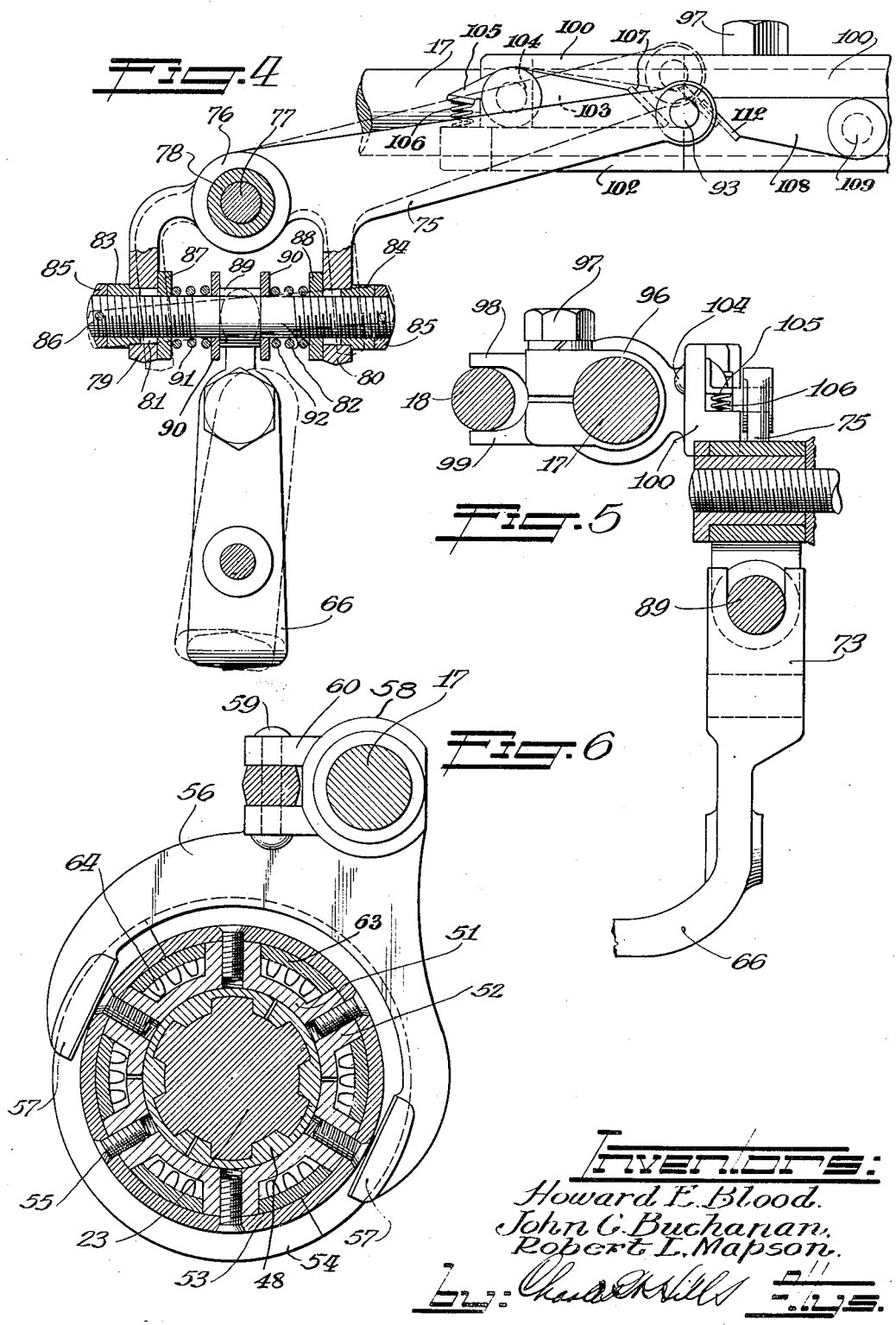

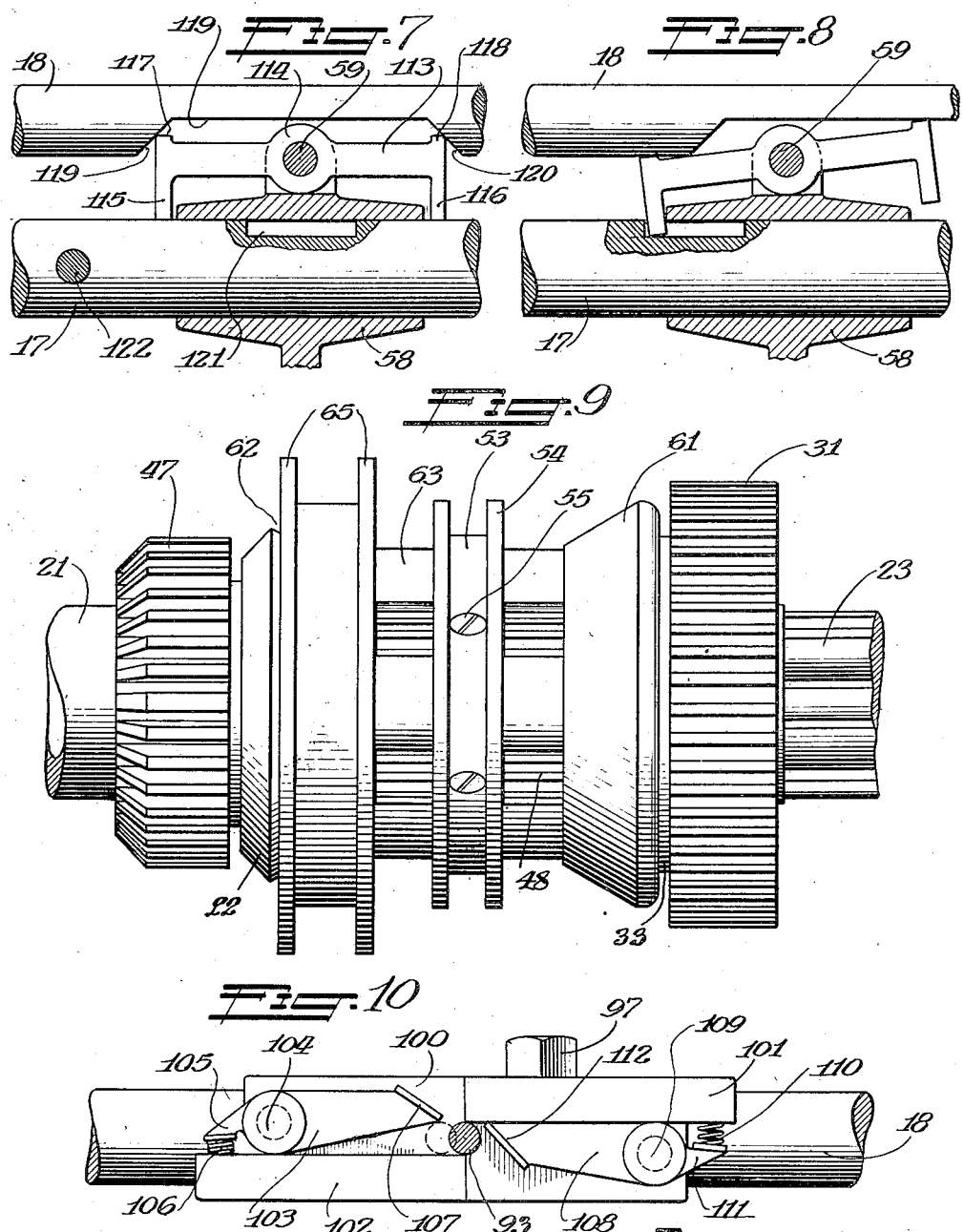

Patented Sept. 19, 1933

1,927,483

UNITED STATES PATENT OFFICE 1,927,483

SYNCHRONIZED TRANSMISSION

Howard E. Blood, John C. Buchanan, and Robert L. Mapson, Detroit, Mich., assignors to Detroit Gear & Machine Company, Detroit, Mich., a corporation of Michigan Application February 1, 1929. Serial No. 336,779

8 Claims. (Cl. 74—58)

This invention relates to synchronized transmissions and particularly to transmissions or gear sets in which the gears about to be meshed are temporarily checked against relative rotation just prior to enmeshment by means actuated positively and indirectly by the gear shifters, whereby no clashing of teeth and noise result when the gears are actually meshed.

An object of the invention is to provide a synchronized transmission mechanism in which a temporary checking of the relative rotation of the gears about to be meshed is effected and which mechanism is easy to operate.

Another object of the invention is to provide a temporary check for gears about to be meshed which operates smoothly without any jerky action.

A further object of the invention is to provide a temporary check for gears about to be meshed in which the check is released just prior to enmeshment to prevent clash.

A further object of the invention is to provide a synchronized transmission or gear set having means for effecting synchronized rotation of gears about to be meshed in which the travel of the sliding gears is such as to allow the synchronizing means to function irrespective of the speed of the shift.

Another and further object of the invention is to provide a novel interlock for the gear shifter which allows the shifter rod to move freely so that it travels a predetermined distance to operate the synchronizing mechanism before moving the gear shifter, but which at the same time will not allow the gear shifter to move in such manner as to cause accidental meshing or demeshing of the gears.

A still further object of the invention is to provide a synchronized transmission or gear set which is economical to manufacture and efficient and positive in operation.

Another and yet further object of the invention is to provide a combined clutch or coupler and synchronizing structure for synchronizing the rotation of the shaft of a transmission gear set with a gear immediately prior to the time the gear is connected to the shaft in driving relation.

The above, other, and further objects of the invention will be apparent from the following description, accompanying drawings, and appended claims.

According to the invention a sliding clutch or clutch member is provided with a checking element which is carried by and is axially movable on said clutch member and which check is actuated positively and indirectly by the gear shifter.

One form of the invention is illustrated in the accompanying drawings and the views thereof are as follows:

Figure 1 is a top plan view of a gear set case with the top removed embodying this invention.

Figure 2 is a longitudinal vertical central section through a three speed forward and reverse transmission or gear set emboding the invention.

Figure 3 is a vertical transverse section taken on line III—III of Figure 1.

Figure 4 is a side elevational view of a means for moving the synchronizer cone showing in full lines the parts in normal position and in dotted lines the position of the parts when braking for what is referred to herein as the second speed.

Figure 5 is a section taken on line V—V of Figure 1.

Figure 6 is a section taken on line VI—VI of Figure 1.

Figure 7 is a fragmental top plan view partially in section of the gear interlock showing the parts when the gear is in neutral position.

Figure 8 is a view similar to Figure 7 showing the interlock when a gear is in mesh for driving purposes.

Figure 9 is an elevational view of the second and high speed gears together with the sliding gear and its supported synchronizing cone.

Figure 10 is a side elevational view of the release means for releasing the synchronizing cone immediately prior to enmeshment of the gears.

The form of the invention chosen to illustrate the same comprises a transmission or gear set having three speeds forward and one reverse.

A transmission casing 15 of the usual type is illustrated and in Figure 1 is shown with the top plate removed.

The casing 15 contains two shifter rods 16 and 17 and a guide rod 18.

The shifter rod 16 in the present embodiment of the invention controls the sliding gear for first speed forward and reverse while shifter rod 17 controls the sliding gear for the second speed forward and high speed.

The shifter rods 16 and 17 are operated in the usual manner by a gear shift lever 19, a portion of which is shown in Figure 2.

The shifter rods 16 and 17 are of course movable axially in the transmission casing 15. The guide rod 18 is fastened in the casing by any suitable means such as a screw 20.

Figure 2 shows a fragmental portion of the engine shaft 21 integrally formed with which is the high speed clutch 22. The main shaft 23 is splined or may be polygonal or of other suitable shape. The engine shaft 21 is supported at its inner end in the transmission casing 15 by ball bearings 24. The inner end of the engine shaft is provided with a centrally disposed recess 25.

The main shaft 23 has its free end reduced in diameter forming the end portion 26 which portion extends within the recess 25 in the engine shaft and is supported therein by means of roller bearings 27. The main shaft 23 is supported in the rear end of the transmission casing 15 by ball bearings 28.

A bushing 29 is supported on the main shaft 23 intermediate its ends which bushing is broached to cooperate with the spline on the main shaft. The bushing 29 has a marginal flange 30 at one end. The second speed gear 31 is arranged on the bushing 29 so as to turn freely on said bushing. The gear 31 is recessed to receive the flange 30 of the bushing. The gear 31 is retained on the bushing by a key 32 which engages suitably arranged keyways in the bushing and the gear thus allowing free rotation of the gear 31 on the bushing 29 and preventing axial movement of the gear. The gear 31 is provided with a lateral annular extension 33 which has internal teeth 34 and its outer surface inclined forming a cone surface 35.

The high speed clutch 22 is provided also with a lateral extension 36 having internal teeth 37 and with its outer surface arranged as a conical surface converging towards the conical surface 35 of the second speed gear 31.

First speed gear 38 is arranged on main shaft 23 so as to rotate with and be moved along said shaft in the usual manner. A shifter fork 39 is operatively associated with first speed gear 38 and is secured to shifter rod 16 in the usual manner.

A countershaft 40 is mounted in the transmission casing 15. A countershaft gear member 41 is supported on the countershaft 40 by roller bearings 42. The countershaft gear member 41 is provided with gears 43, 44, 45 and 46.

The high speed gear 22 has formed integrally therewith a gear or pinion 47 which is in mesh at all times with gear 43 on the countershaft gear 41. The second speed gear 31 is in mesh at all times with the gear 44 on the countershaft gear 41. The gear 45 of the countershaft gear 41 is arranged to be meshed with first speed gear 38 in the usual manner. The gear 46 on the countershaft gear 41 is the one in mesh with an idler gear not shown for reversing the direction of movement of the main shaft 23 when the vehicle is to be reversed.

The sliding clutch or couple for selectively connecting the high speed gear 22 or the second speed 31 in driving relation comprises an elongated shell 48 which may be made in two parts if desired which shell is broached or otherwise fashioned on its interior to mesh with the splines on the main shaft 23 or to correspond to the contour of the same if polygonal or of other shape. Axially extending teeth 49 are formed on the exterior of the shell 48 for meshing with the internal teeth 34 on the second speed gear 31 and the internal teeth 37 on the high speed gear 22 whenever the shell or sliding clutch is moved in the proper direction and a predetermined distance.

The shell 48 is provided with an intermediate annular recess 50 which receives an inner shifter ring 51, (Figure 6). The inner shifter ring 51 is provided with a plurality of radially extending lugs 52 which are circumferentially spaced. The ring 51 is preferably made in two parts. An outer shifter ring 53 having spaced side walls 54 to provide a groove is secured to the inner shifter ring 51 by screws or bolts 55 passing through suitably arranged apertures in the outer shifter ring 53 and threaded into the lugs 52 of the inner shifter ring. It will be observed that this arrangement of the inner and outer shifter rings provides a series of spaces between the inner and outer rings and between the lugs 52 which spaces may be observed readily from Figure 6.

A shifter fork 56 has its spaced ends 57 engaging within the groove formed by the side walls 54 of the outer shifter ring 53.

The shifter fork 56 is free to slide on the shifter rod 17 and is carried by a hub 58 which slides on said rod 17 and is held in neutral position by the interlock 118 or in engaged position by a pin 122, or in engagement with the high speed gear by the hub 96.

The braking element is referred to herein as the synchronized cone or cone structure.

Figure 9 is an elevational view of the synchronizer cone structure as assembled with the sliding clutch or coupler 48.

The cone structure comprises an integral member including an end cone 61 having the interior thereof divergent so as to cooperate with the cone surface 35 on the second speed gear 31. A second cone 62 is arranged at the other end of the member with the interior surface thereof divergent to coact with the cone surface on the high speed gear 22. The cones 61 and 62 are connected by axial webs 63 which are spaced circumferentially and preferably arcuate in cross section. The cone structure or member is assembled with the sliding clutch 48 by arranging the webs 63 within the spaces between the lugs 52 of the inner shifter ring 51 before the outer shifter ring 53 is secured in position. Fastening the outer shifter ring 53 in the position as heretofore described and as shown in Figures 6 and 9 supports the synchronizer cone on the sliding clutch 48 so that said cone structure will rotate with said clutch. Internal teeth 64 are formed on the inner surfaces of the axial webs 63 of the synchronizer cones and also on the inner surfaces of the cones 61 and 62 for meshing with the teeth 49 on the sliding clutch 48 so as to afford positive rotation of the cone member with the sliding clutch. The cone member is axially movable with respect to the sliding clutch 48.

The cone 62 in addition to serving as a brake for the high speed gear 22 is provided with spaced annular flanges 65 forming a groove for a shifter.

A yoke 66 (Figure 3) is pivoted at 67 and 68 transversely of the transmission housing 15 and arranged with the free ends of the yoke extending upwardly from the pivotal connections. Shoes 69 and 70 are pivoted at 71 and 72 respectively to the ends of the yoke, said shoes entering between the flanges 65 on the cone 62 for the purpose of moving the braking or synchronizing cone structure whenever the yoke 66 is rocked.

The pivotal connections 67 and 68 and 71 and 72 are of course arranged to adjust movement of the yoke 66 and the supported shoes 69 and 70 to secure easy and efficient operation.

The end 73 of the yoke which carries the shoe 69 is extended upwardly above the pivot 71 and is provided with a U-shaped recess 74.

A synchronizer cone control arm 75 is integrally formed in connection with a hub 76 which hub is pivoted on pivotal member 77 passing through one side of the transmission case 15 above the yoke 66. A bushing 78 is interposed between the stub shaft support 77 and the hub 76. The arm 75 is provided with two downwardly extending spaced ears 79 and 80 arranged one on each side of the pivot 77, (Figures 1 and 4). The ears 79 and 80 are apertured at 81 and a headless bolt 82 of smaller diameter than the apertures 81 and having an enlarged central portion or sleeve 89 extends through these apertures. Nuts 83 and 84 are threaded onto each end of the bolt 82 outwardly of the ears 79 and 80 with portions of the nuts entering the apertures 81 for centering the bolt 82 in the same. Retaining rings 85 are arranged outwardly of the nuts 83 and 84 on the bolt 82 and are fastened by wire or cotter pins 86. Washers 87 and 88 are threaded on the bolt 82 inwardly of the ears 79 and 80 as shown in Figure 4. Two washers 90 are disposed on either side of the central portion 89 of the bolt 82, and springs 91 and 92 are interposed between the washers 87 and 88 and the washers 90 for exerting pressure to center the yoke 66 when the synchronizer control arm 75 is in neutral position or for exerting pressure on the yoke 66 when the synchronizer control arm is rocked.

The central portion 89 of the bolt 82 receives the recess 74 of the end 73 of the yoke 66.

The other end of the arm 75 is provided with an inwardly or laterally projecting pin 93.

The stub shaft 77 is in the form of a bolt which is in threaded engagement with the bushing 78 engaging the hub 76 of the arm 75 which bushing is formed at the inner end thereof with a flange 95 for engaging against the rear side of the hub 76 to retain the arm 75 in position in the casing 15.

A cam arrangement is provided for rocking the arm 75 to rock the synchronizer cone yoke 66 for moving said cone to brake either second speed gear 31 or high speed gear 22 when the clutch member 48 is about to be meshed with either of these gears. The braking effect is rather between these gears and the clutch member.

A hub 96 is fastened to shifter rod 17 by means of a bolt 97. Said hub has laterally extending vertically spaced ears 98 and 99 for resting on the top and underside respectively of the guide rod 18 so as to prevent rotation of the hub 96 and its connected parts.

The hub 96 is provided with a lateral portion 100 on the opposite side from the lugs 98 and 99 which portion extends parallel to the shifter rod 17 and projects endwise beyond the hub 96. The member 100 is provided with two lateral extensions or ledges 101 and 102 which are arranged one at each end of the portion 100 and which are offset vertically as may be seen in Figure 10. A rocker 103 is pivoted at 104 to one end of the member 100 and has an extension or tail 105 outwardly of the pivot 104. A spring 106 is interposed between the portion 102 and the extension 105 for normally retaining the rocker 103 against the top surface of the projection 102 as is shown in full lines in Figure 4. The other end of the rocker 103 is provided with an inclined lateral extension 107 which lies in the path of the pin 93 on the outer end of the synchronizer control arm 75.

A similar rocker 108 is pivoted at 109 to the other end of the member 100 and normally is retained against the underside of the lateral projection 101 of said member by a spring 110 which cooperates with an extension 111 of said member 108. The member 108 is provided with a similar inclined lateral projection 112 inclined in the same direction as is the projection 107 on the rocker 103. The end 112 likewise lies in the path of movement of pin 93 on the synchronizer control arm 75.

The gear interlock is illustrated in Figures 1, 7 and 8, and comprises a bar 113 having a hub 114 intermediate its length which is pivoted on the pin 59 passing through the ear 60 on the hub 58 of the sliding gear shifter. The bar 113 is provided at each end with ends 115 and 116 of equal length which normally rest against the shifter rod 17 maintaining the bar 113 parallel to said shifter rod. The ends 115 and 116 are extended beyond the rod 113 a slight distance to provide projections 117 and 118.

The guide rod 18 is recessed at 119 with the ends of said recess inclined and diverging. Normally the interlock when the sliding gear is in neutral position is that as shown in Figure 7 with the projections 117 and 118 resting against the inclined ends 119 and 120 respectively of the recess.

The shifter rod 17 is provided with a slot 121 which in neutral position lies with its middle in line with the axis of the pin 59.

A pin 122 is passed through the shifter rod 17 and extends a slight distance from the same.

The synchronizer cone when moved as hereinafter described being geared to the sliding clutch 48 frictionally engages either the second speed gear 31 or the high speed clutch 22 and clutches or checks the gear and the sliding clutch against relative rotation temporarily prior to enmeshment. The control arm 75 actuated as hereinafter described releases the synchronizer cone from its braking effect immediately prior to meshing to enable intermeshing of the gears should the ends of the teeth on the sliding clutch 48 be against the ends of the teeth on either of the gears into which it is to be moved in enmeshment.

Actuation of the synchronizer cone and its control arm 75 is effected positively and directly by the gear shifter rod.

The operation of the invention is as follows:

Assumed that the motor vehicle has been started by the first speed gear 38 being brought into mesh with the gear 45 on the countershaft gear 41 and it is now desired to go into second or intermediate speed. The lower end of the gear shift lever 19 is moved to the right and forwardly thus moving the shifter rod 17 to the right as viewed in the drawings. Movement of the rod 17 to the right will bring the pin 122 in said rod against the hub 58 on the sliding gear shifter fork thus starting the movement of the sliding clutch 48 to the right as observed in Figure 2. Movement of the rod 17 to the right will move the hub 96 which is fastened to it to the right also. Such movement to the right of the hub 96 will bring the projection 107 on the rocker member 103 of the cam member 100 underneath the pin 93 on the end of the synchronizer control arm 75 raising it to the dotted line position of Figure 4. This movement of the arm 75 rocks the synchronizer cone yoke 66 into the dotted line position of Figure 4 thereby moving the cone to the right so that the cone 61 thereof engages the extension 33 of the second speed gear 31 clutching or checking the sliding clutch 48 and the second speed gear 31 against relative rotation and connecting the gears for rotation in synchronism. This movement takes place before the hub 58 is moved as the rod 17 is free to move thru the hub 58 until the pin 122 strikes it. This relation obtains until continued movement of the gear shift lever 19 moves the block 100 and its attached rocker arm 103 so that the pin 93 will ride over and then be freed from the projection 107 thus enabling the arm 75 to be returned to normal position which is that shown in full lines in Figure 4. This return to normal position is accomplished by the springs 91 and 92 on the bolt 82 and by the natural stresses of the parts in synchronizing position. Movement of the arm 75 and its connected yoke 66 will return the yoke 66 to normal position thus moving the synchronizer cone slightly to the left releasing it from engagement with the sliding clutch 48 and the second speed gear 31 so that the final travel of the sliding clutch 48 will be such as to move it into mesh with the internal teeth 34 of the second speed gear 31 without noise or clash.

The parts are so arranged that at the moment when the travel of the shifter rod 17 has been such as to move the block 100 far enough to the right to allow the pine 93 to ride over the projection 107 and free the synchronizer cone, the pin 122 carried by the shifter rod 17 has reached a point where it engages the hub 58 of the shifter fork 56 and the slot 121 in the rod 17 is directly under the projection 116 of the arm 113. This enables the arm 113 to rock in such manner that the end 118 of the arm 113 clears the guide incline 120 and the pin 122 may then push the hub 58 and gear shift fork 56 to effect enmeshing between sliding clutch 48 and the second speed gear 31, completing positive drive connections thru these members. Since the members 48 and 31 have been brought into synchronism, just prior to meshing by the synchronizer cone, such meshing takes place without noise or clash. Release of the synchronizer cone is effected immediately prior to meshing of these two gears so that should the ends of the teeth 49 on the sliding clutch 48 be against the ends of the teeth 34 on the second speed gear 31, meshing will take place because of the fact that the ends of these teeth are cambered in the usual manner, thereby allowing proper meshing as the sliding clutch is forced into engagement with the second speed gear 31. The end of the bar 113 is moved to the right the same distance as is shown as being moved to the left in Figure 8 for locking the sliding clutch 48 in the second driving position. The shifter rod 17 is held in position by the usual mesh lock ball and spring (not shown). It will be observed that the end of the bar 113 is moved underneath the cylindrical surface of the guide rod 18 so as to prevent any disengagement between the end 116 and the slot 121 thus securely locking the sliding clutch 48 in mesh with the intermediate or second gear 31.

The shifter rod 17 is moved to the left when the intermediate gear is to be demeshed. The end 116 of the bar 113 is caught in the slot 121 and pulls the shifter fork back until the end 117 of the bar 113 strikes the inclined surface 119 of the recess whereupon the bar 113 is rocked into position parallel with rod 17, thus releasing rod 17 from the hub 58 so that the rod is free to slide to the left far enough to force pin 93 under the projection 107 on cam 103, raising it against the tension of spring 106. The cam 103 is returned to normal position by the spring 106 as soon as the pin 94 returns to the position shown in Figure 10. The cam 103 is constructed in this manner to prevent actuation of the synchronizing cone on the return of clutch 48 to neutral position.

Movement into high gear is accomplished by moving the gear shift lever in the opposite direction. The parts go thru the same cycle of movements except that the rod 17 moves to the left and the synchronizer control arm 75 moves downwardly under influence of cam 122 on rocker 108, which moves the synchronizing cone to the left to engage high speed gear cone 36. Demeshing is accomplished in the same manner except that the shifter rod 17 moves to the right.

It will be observed that the shifter rod 17 is actuated in either direction a certain distance before bringing into effect the braking action of the synchronizer cone. This enables the demeshing of the previously meshed clutches prior to the braking action so that no matter how fast the shift is made the sliding clutch will be released and then synchronized or checked against relative rotation with respect to the other gear with which it is to be meshed. Furthermore, release of the clutching or checking effect is accomplished immediately prior to meshing in either direction.

The apparatus of this invention is one in which a positive clutching or checking effect is established between the sliding clutch and either of the gears into which it is to be moved for meshing with a positive mechanical release operated positively but indirectly from the shifter. The parts are so arranged that the sequence of actions is positive in every respect so as to accomplish proper meshing of the gears without any noise or clash whatsoever.

The interlock is positive and is controlled by the shifter. There are no springs or other yieldable elements to become ineffective and thus accidentally allow demeshing of the gears.

The transmission casing 15 is provided with a top plate 123 fastened in the usual manner.

This invention has been described herein more or less precisely, yet it is to be understood that changes may be made in the arrangement and proportion of parts and that equivalents may be substituted without departing from the spirit and scope of the invention.

The invention is claimed as follows:

1. A transmission gear set including axially immovable gears and a shiftable clutch, means for selectively shifting said clutch into clutchable engagement with either of said gears, a collar about said clutch and slidable thereon, a rocker yoke connected to said collar, a cone structure about said clutch and connected to said collar, said cone structure being relatively movable with respect to said clutch, means indirectly connecting said clutch shifting means and said yoke for moving said collar and cone structure to synchronize the rotation of said clutch and a gear prior to meshing therebetween, and means for moving said collar and cone structure from synchronizing position immediately prior to meshing of said clutch and gear, said cone structure being movable in the release movement in a direction opposite to that in which it was first moved as stated.

2. A gear set including a splined or polygonal shaft, a clutch member slidable thereon, gear means with which said clutch member is engageable when slid on said shaft a predetermined amount, means for effecting the sliding movement of said clutch member, said clutch member including a shell like member, an inner shifter ring associated with the same, said ring having radially extending lugs, an outer shifter ring secured to said lugs, an axially movable structure carried by said clutch member having webs passing axially through the spaces between said lugs and said inner and outer rings and having cones integral with the ends of said webs, said structure being actuated positively and indirectly by said clutch sliding means for temporarily checking the clutch member and gear means against relative rotation prior to meshing.

3. A gear set including a splined shaft, a clutch member slidable thereon, gear means with which said clutch member is engageable when slid on said shaft a predetermined amount, means for effecting the sliding movement of said clutch member, said clutch member including a shell like member, an inner shifter ring associated with the same, said ring having radially extending lugs, an outer shifter ring secured to said lugs, an axially movable structure carried by said clutch member having webs passing axially through the spaces between said inner and outer shifter rings and said lugs and having cones integral with said webs, a shifter ring associated with said structure, a pivoted yoke engaging said last mentioned ring, an oscillatable arm associated with said yoke, and means actuated positively and indirectly by said third mentioned means for oscillating said arm to rock said yoke to move said structure in a direction to temporarily check said clutch member and said gear means against relative rotation prior to meshing, and means for releasing said checking means immediately prior to meshing.

4. In a transmission gear set including a splined or polygonal shaft, a gear freely rotatable on said shaft, a clutch member on said shaft slidable into and out of clutching engagement with said gear, means for synchronizing the speeds of said gear and said clutch member, said means including a shifter ring connected to said clutch member and having axial openings in the ring, a cone member carried by said clutch member and having webs passing through the openings in said ring, a shifter ring connected to said cone member, a conical surface on said gear engageable by said cone member, clutch member actuating means associated with the clutch member shifter ring, means engaging said cone member shifter ring for moving said cone member with and with respect to said clutch member, and means actuated by the clutch member shifting means for causing movement of said cone member with said clutch member for a portion of the travel of the clutch member and then reversing the direction of movement of said cone member as the clutch member continues its movement in its initial direction.

5. A gear set including a splined shaft, gear means in axial alignment with said shaft and freely rotatable with respect to the same, a combined sliding clutch and brake structure on said shaft, said structure comprising a shell gear in mesh with said splined shaft, an inner shifter ring arranged on said shell gear, said ring having a plurality of spaced radial lugs, an outer shifter ring fastened to said lugs and defining spaces between said rings and lugs, the brake structure comprising conical end rings connected by axial webs which webs pass through the spaces formed by said rings, the webs being arranged outwardly of the teeth on said shell gear, said brake being axially movable with respect to said gear shell, means engaging a shifting ring on said sliding clutch for moving said clutch into clutchable engagement with said gear means, means associated with said brake structure and actuated positively and indirectly by said last mentioned means for moving said brake structure in the same direction as said sliding clutch to temporarily lock said sliding clutch and said gear means against relative rotation prior to meshing, and means for moving said brake structure in the opposite direction for releasing said locking means immediately prior to meshing.

6. A power transmission set including a splined shaft, clutch means slidable on said shaft, gear means on said shaft freely rotatable with respect thereto and restrained against axial movement and with which said clutch is engaged when said clutch is slid on said shaft a predetermined distance, axially movable means on said clutch means for temporarily synchronizing the speed of the clutch and gear means just prior to meshing, a shifter rod, a fork loose on said rod for effecting sliding movement of said clutch means, a fork fixed to said rod for effecting actuation of said synchronizing means, means on said rod for engaging and moving said loose fork with said rod after predetermined travel of said rod, and means including a rocker arm connected to said synchronizing means and engageable by said fixed fork to move the synchronizing means axially into synchronizing engagement with said gear means, the loose fork being engaged by its moving means after the synchronizing means have been moved by said fixed fork into synchronizing engagement with said gear means and released from such synchronizing engagement.

7. A power transmission set including a splined or polygonal shaft, a gear freely rotatable on said shaft, said gear being restrained against axial movement, a clutch member on said shaft and rotatable with it and slidable into and out of driving engagement with said gear, means for synchronizing said clutch member and gear, said means including a shifter ring connected to said clutch member having axial openings in the ring, a cone member carried by said clutch member and having webs passing through the openings in said ring, a shifter ring connected to said cone member, a conical surface on said gear engageable by said cone member, clutch member actuating means associated with the clutch member shifter ring, means engaging said cone member shifter ring for moving said cone member with, and with respect to, said clutch member, and means actuated by the clutch member shifting means for causing movement of said cone member into synchronizing engagement with said gear and then reversing the direction of movement of said cone member immediately prior to initiation of movement of said clutch member toward said gear, the clutch member actuating means being moved in one direction for actuating the synchronizing means in the manner stated and then moving the clutch member into engagement with said gear.

8. A transmission gear set including in combination, a shaft, two freely rotatable gears on said shaft restrained against axial movement, a shiftable clutch on said shaft, means for shifting said clutch into and out of clutchable engagement with either of said gears, a shifter rod; means for shifting said rod; a shifter fork loose on said rod; means on said rod engageable with said fork for moving it; a second shifter fork fixed to said rod; said second fork carrying two yieldable members each of which is provided with an inclined surface, the members being so disposed that the inclined surfaces are spaced from each other and normally parallel; connections between said loose fork and said clutch member; synchronizing mechanism; a rocker arm for actuating said synchronizing mechanism; said rocker arm having a projection normally lying between said inclined surfaces; the arrangement being such that when the shifter rod is moved, one of said inclined surfaces engages said projection to rock said rocker arm in one direction to move said synchronizing mechanism into synchronizing engagement with said clutch member and one of said gears and, when said rod is moved in the reverse direction, the other of said inclined surfaces engages said projection to rock said arm in the opposite direction to move said synchronizing mechanism into synchronizing engagement with said clutch member and the other of said gears; the extent of the inclined surfaces being such that said projection leaves the engaged inclined surface at the moment the loose shifter fork engaging means on said rod engages said loose fork to move it with the rod in the then direction of movement and to move said clutch member into clutchable engagement with a gear; the movement of said rocker arm in either direction by an inclined surface in the manner stated effecting movement of the synchronizing mechanism to synchronizing position with said clutch member and one of said gears and the escape of the projection from the inclined surface releasing the synchronizing mechanism from synchronizing position, and spring means effective when said projection leaves its engaged inclined surface to oscillate said arm in the opposite direction to normal position and with such movement moving said synchronizing mechanism in the opposite direction.

HOWARD E. BLOOD.
JOHN C. BUCHANAN.
ROBERT L. MAPSON.